United States Patent Office 3,639,314
Patented Feb. 1, 1972

3,639,314
PROCESS FOR THE PREPARATION OF HIGH-VISCOSITY ALKYD RESINS
Martin Cherubim, Rheinkamp-Eick-West, and Friedrich Henn, Homberg (Lower Rhine), Germany, assignors to Rheinpreussen Aktiengesellschaft fuer Bergbau und Chemie, Homberg (Lower Rhine), Germany
No Drawing. Continuation of application Ser. No. 750,746, Aug. 7, 1968. This application Apr. 28, 1970, Ser. No. 31,819
Claims priority, application Germany, Aug. 9, 1967, R 46,680
Int. Cl. C09d 3/64
U.S. Cl. 260—22 EP     15 Claims

ABSTRACT OF THE DISCLOSURE

Process for the preparation of alkyd resins of high viscosity, characterized in that 100 weight parts of alkyd resin are mixed with 0.1 to 10 weight parts of a nitrogen-containing glycidyl compound which contains at least two glycidyl groups bonded to amine nitrogen, and the mixture is condensed at temperatures between 20° C. and 200° C. to the desired viscosity.

---

This application is a continuation of application Ser. No. 750,746, filed Aug. 7, 1968, now abandoned.

BACKGROUND

For many applications in the varnish resin field, it is desirable for the alkyd resins used as raw materials to have an especially high viscosity of, for example, 300 to 1000 centipoises for a 40 to 60% solution. In this way, alkyd resins of higher viscosity can be combined better with many pigments to form homogeneous color varnishes (enamels).

Alkyd resins of high viscosity can be obtained by reheating at high temperatures, usually ranging between 200° C. and 300° C., the alkyd resins being prepared, for example, from castor oil, glycerol and phthalic anhydride, whereupon they further condense with the formation of cross-linkage products of higher molecular weight.

In this type of post-condensation, however, it is a disadvantage that the setting time of the alkyd resins may be very greatly shortened. This great reduction of the setting time can be very troublesome in the working of the alkyd resins, and especially in manufacturing processes, or, in special cases, it can render the economical achievement of high degrees of condensation practically impossible.

Many alkyd resins also have a strong tendency to yield volatile condensation products, such as water, during the post-condensation. Such products may have a very unfavorable effect on the properties of the resin.

The invention is therefore directed to the problem of creating alkyd resins of high viscosity without the disadvantages associated with the hitherto customary post-condensation.

SUMMARY

It has now been found that this aim can be achieved by mixing the alkyd resins, whose acid number being 1 to 100 and preferably 10–50, with 0.1 to 10% by weight of nitrogenous glycidyl compounds containing at least two glycidyl groups bonded to amine nitrogen atoms, and post-condensing them at temperatures between about 20° C. and 200° C., preferably about 50–200° C. As compared with the temperatures otherwise used, therefore, the post-condensation here takes place in a relatively low temperature range. This results in the formation of alkyd resins of higher molecular weight having viscosities of 75–100 seconds or more. Surprisingly, in spite of the more extensive cross-linking and molecule enlargement with this post-treatment of the alkyd resins, there is only a relatively slight reduction of the setting time, and highly viscous, easy-to-work resins can be obtained without difficulty.

But this effect is also surprising on account of the fact that, in the case of other monovalent or polyvalent epoxide compounds, e.g., those on the basis of diane (2.2-bis-(4-hydroxyphenyl)-propane or bisphenol A) no analogous action can be discerned in the stated range of temperatures.

The epoxide compounds are usable for the process of the invention only if they contain at least two epoxide groups, which are bonded to amine nitrogen atoms in the form of glycidyl groups.

EMBODIMENTS

The glycidyl groups can be bonded to the same nitrogen atom, as in the case, for example, of N-diglycidyl-isopropylamine; they may also be bonded to different nitrogen atoms, as in the case, for example, of N,N'-diglycidyl-N,N'-diisopropyl-1,3-diamino-2-hydroxypropane.

The reaction of the alkyd resin with the epoxide compound can be performed with or without the presence of a diluent. The alkyd resin can be mixed and reacted with the epoxide compound before or after the removal by distillation of the solvent usually present in the alkyd resin from its manufacture. It is also possible, however, first to distill off the solvent and then dissolve the alkyd resin in another solvent or diluent and then react it with the epoxide compound. The solvent, in that case, must not, however, itself react with the epoxide compound. The alkyd resin in that case is cooked with 0.2 to 10 parts by weight of epoxide compound per 100 parts by weight of alkyd resin at 20° C. to 200° C. and can then also be diluted with ethanol-amyl acetate (38:2) to 60% by weight.

The alkyd resins cooked according to the process of the invention display different behavior than mixtures of alkyd resins with epoxide compounds which are applied directly without cooking them; for example, they have no epoxide group content, or a substantially smaller one, and they cure more rapidly.

Alkyd resin combinations prepared by the method of the invention have very good compatibility with pigments, as, for example, with carbon blacks such as those used for black enamels. They have good body, dry rapidly, and have a high gloss.

EXAMPLE 1

(A) Nature of the alkyd resin: Non-drying phthalate resin with approx. 40% castor oil and an acid number of approx. 15–25 (measured on a 60 weight-% solution in xylene), commercially available as "Rhenalyd KN 35."

(B) Viscosity of the alkyd resin (measured on 60% solution in ethanol-amyl acetate (38:2) according to DIN 53 211 in a 4 mm. DIN standard beaker):52 seconds.

(C) Nature and quantity of added epoxide compound per 100 g. of the undissolved alkyd resin: (1) 2 g. diane diglycide (2) 8 g. diane diglycide (3) 2 g. N-diglycidyl-isopropylamine (4) 2 g. of a mixture of approx. 50 wt. percent N-diglycidylisopropylamine and approx. 50 wt. percent N,N'-diglycidyl-N,N'-diisopropyl-1,3-diamino-2-hydroxypropane.

(D) Reaction (cooking): (1) 1 h. at 100° C. (2) 1 h. at 100° C. (3) 1 h. at 100° C. (4) 1 h. at 100° C.

(E) Viscosity of the reacted alkyd resin (measured in 60% solution in ethanol-amyl acetate (38:2) according to DIN 53.211 in a 4 mm. DIN standard beaker): (1) 51 sec. (2) 49 sec. (3) 114 sec. (4) 102 sec. Without the addition of epoxide resin, a mere thermal post-treatment will not condense the alkyd resin to a viscosity of more than 100 sec. in a 4 mm. DIN beaker!

EXAMPLE 2

(A) Nature of the alkyd resin: air and oven-drying phthalate alkyd resin containing approx. 42% by weight of a mixture of dehydrated castor oil and soya oil and having an acid number of approx. 30 (measured on a 60 weight-percent solution in xylene), available as "Rhenalyd RS 42."

(B) Viscosity of the alkyd resin (measured on a 40% solution in xylene) according to DIN 53211 in a 4 mm. DIN standard beaker at 20° C.: 24 seconds.

(C) Nature and quantity of added epoxide compound per 100 g. of the undissolved alkyd resin: 2.5 g. of a mixture of approx. 50 wt.-percent N-diglycidylisopropyl-amine and 50 wt.-percent of N,N'-diglycidyl-N,N'-diiso-propyl-1,3-diamino-2-hydroxy-propane.

(D) Reaction (cooking): 5 h. at 140° C.

(E) Viscosity of the reacted alkyd resin (measured on a 40% solution in xylene) per DIN 53 211 in a 4 mm. DIN standard beaker at 20° C.: 144 sec.

The alkyd resin obtained by the cooking can be worked as follows: 90 parts by weight of the 50% xylene solution of the resin is mixed with 10 parts by weight of a suitable carbon black, thereby producing a paste.

20 parts by weight of this paste is mixed with another 50 parts by weight of the 50% xylene solution of resin, and with 22.5 parts by weight of xylene, 5 parts by weight of sec. butanol, and 2.5 parts by weight of a dryer. The dryer for this purpose is prepared by mixing 1 part by weight of cobalt naphthenate, 2 parts of lead naphthenate (24% Pb) and 7 parts of xylene.

The black enamel thus obtained dries in about 10 minutes to a non-tacky condition and produces a high gloss.

By alkyd resin is meant the substances resulting from interaction of polyhydric alcohols and polybasic acids or anhydrides, for example the reaction product of phthalic acid and glycol or glycerol. The invention particularly contemplates alkyd resins, including, in the conventional manner, as modifying agents, various preferably natural oils.

The glycidyl compounds are preferably propyl amines particularly isopropyl amine containing at least two glycidyl groups attached to the same, or different amine nitrogen atoms.

The products of the invention, in general, have viscosities of in excess of about 75 seconds, preferably in excess of about 100 seconds.

Viscosity values in seconds are on the basis set forth in the examples hereof, unless otherwise indicated.

What is claimed is:

1. Process for the preparation of alkyd resins having a viscosity of at least 75 seconds, measured in a 60% solution in ethanol-amyl acetate (38:2) according to DIN 53 211 in a 4 mm. DIN standard beaker, soluble in xylene and in which pigments can be dispersed for production of homogenous color varnishes, which comprises:

(a) mixing 100 weight parts of an alkyd resin having an acid number of 1 to 100, with 0.1 to 10 weight parts of a nitrogen-containing glycidyl compound which contains at least two glycidyl groups bonded to amine nitrogen, (b) maintaining the mixture at about 20–200° C. for a time sufficient to achieve said viscosity, and (c) terminating the condensation to provide said alkyd resin of said high viscosity and solubility.

2. Process according to claim 1, wherein said temperature is about 50–200° C.

3. Process according to claim 1, wherein said temperature is about 50–150° C.

4. Process according to claim 1, wherein the acid number of the alkyd resin is about 10–50.

5. Process according to claim 1, wherein said viscosity is more than about 100 seconds.

6. Process according to claim 1, wherein said alkyd resin includes a natural oil as a modifying agent.

7. Process according to claim 6, wherein said condensation is performed in presence of an inert solvent or diluent.

8. Process according to claim 6, wherein the glycidyl compound is a propyl amine.

9. Process according to claim 8, wherein said propyl amine is an isopropyl amine.

10. Process according to claim 6, wherein said glycidyl compound is N-diglycidylisopropylamine and/or N,N'-diglycidyl-N,N'-diisopropyl-1,3-diamino - 2 - hydroxypropane.

11. Alkyd resin produced by the process of claim 1.
12. Alkyd resin produced by the process of claim 6.
13. Alkyd resin produced by the process of claim 8.
14. Alkyd resin produced by the process of claim 10.
15. Varnish composition comprising as essential characterizing ingredients an alkyd resin according to claim 11 and a pigment.

References Cited
UNITED STATES PATENTS

| 3,027,341 | 3/1962 | Boucher et al. | 260—22 |
| 3,278,636 | 10/1966 | Wynstra | 260—835 |
| 3,329,652 | 7/1967 | Christie | 260—47 |
| 3,397,254 | 8/1968 | Wynstra et al. | 260—835 |

HOSEA E. TAYLOR, Primary Examiner

R. W. GRIFFIN, Assistant Examiner

U.S. Cl. X.R.

117—161 K; 260—22 M, 32.6 R, 33.6 R, 40 R, 75 N, 75 EP